US011906128B1

(12) United States Patent
Chen et al.

(10) Patent No.: US 11,906,128 B1
(45) Date of Patent: Feb. 20, 2024

(54) LAMP HAVING OPTICS AND ILLUMINATING LIGHT GUIDES

(71) Applicant: Ford Global Technologies, LLC, Dearborn, MI (US)

(72) Inventors: Linsheng Chen, Novi, MI (US); Arun Kumar, Farmington Hills, MI (US); Brandon J. Schwandt, Madison Heights, MI (US); Derek English, Detroit, MI (US); Omar Benjamin Lara Monarrez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/141,589

(22) Filed: May 1, 2023

(51) Int. Cl.
*F21S 43/241* (2018.01)
*F21S 43/247* (2018.01)
*F21S 43/14* (2018.01)
*F21W 103/35* (2018.01)

(52) U.S. Cl.
CPC ............. *F21S 43/241* (2018.01); *F21S 43/14* (2018.01); *F21S 43/247* (2018.01); *F21W 2103/35* (2018.01)

(58) Field of Classification Search
CPC ..................................................... F21S 43/241
See application file for complete search history.

(56) References Cited

U.S. PATENT DOCUMENTS 6,724,543 B1 * 4/2004 Chinniah ................ F21S 43/26 362/335
D523,974 S 6/2006 Meyers
7,410,274 B2 * 8/2008 Nagabuchi ............ F21S 43/315 362/346
9,541,703 B2 1/2017 Moriyama et al.
10,330,902 B1 * 6/2019 Marcoux .............. G02B 5/0278
10,598,333 B1 * 3/2020 Lee ....................... F21S 43/249
10,766,413 B1 9/2020 Vemulapati et al.
11,220,210 B1 1/2022 Chen
2005/0189545 A1 * 9/2005 Tazawa ................ F21S 43/237 257/79
2008/0259630 A1 * 10/2008 Chinniah ............. F21S 43/315 362/338
2009/0185389 A1 * 7/2009 Tessnow ............. G02B 6/0038 362/516
2016/0347234 A1 * 12/2016 Herbin ..................... B60Q 1/26
2022/0090753 A1 * 3/2022 Kang ...................... F21S 41/25

FOREIGN PATENT DOCUMENTS

JP 07112640 A 5/1995

* cited by examiner

*Primary Examiner* — Eric T Eide
(74) *Attorney, Agent, or Firm* — Vichit Chea; Price Heneveld LLP

(57) ABSTRACT

A lamp includes a light source, a central lens optically aligned with the light source to receive a first portion of light emitted by the light source and transmit the first portion of light in a first output beam, a side emitting lens generally disposed between the central lens and the light source and arranged to receive a second portion of the light, and a plurality of light guides each having a light input end and operatively coupled to the side emitting lens to receive the second portion of light emitted from the light source that is directed through the side emitting lens and having a light output end, wherein each of the plurality of light guides has a light refraction structure on a first side for directing the second portion of the light in a second output beam from a second side.

20 Claims, 6 Drawing Sheets

LAMP HAVING OPTICS AND ILLUMINATING LIGHT GUIDES

FIELD OF THE DISCLOSURE

The present disclosure generally relates to lighting devices, and more particularly relates to a lamp having light guides and an optical system with high optical efficiency.

BACKGROUND OF THE DISCLOSURE

Automotive vehicles are commonly equipped with various lighting devices. For example, vehicle exterior lamps may include brake lamps and taillamps at the rear end of the vehicle. It may be desirable to provide for a lamp that provides high optical efficiency that may be used on a vehicle.

SUMMARY OF THE DISCLOSURE

According to a first aspect of the present disclosure, a lamp is provided and includes a light source, a central lens optically aligned with the light source to receive a first portion of light emitted by the light source and transmit the first portion of light in a first output beam, and a side emitting lens generally disposed between the central lens and the light source and arranged to receive a second portion of the light. The lamp also includes a plurality of light guides each having a light input end and operatively coupled to the side emitting lens to receive the second portion of light emitted from the light source that is directed through the side emitting lens and having a light output end, wherein each of the plurality of light guides has a light refraction structure on a first side for directing the second portion of the light in a second output beam from a second side.

Embodiments of the first aspect of the present disclosure can include any one or a combination of the following features:

- the light refraction structure comprises a plurality of prisms;
- each prism has a V-shaped groove formed in a surface of a light transmissive medium;
- the V-shaped groove has an incline angle in the range of 30-60 degrees, and wherein each prism has a depth and a length that increases along a length of the light guide from a first location closer to the input as compared to a second location closer to the output;
- a gap between adjacent prisms decreases along a length of the light guide from the light input end to the light output end;
- the light refraction structure comprises a textured surface;
- the textured surface increases in density from the input to the output;
- the lamp is configured to be installed on a vehicle;
- the lamp is configured to be installed as a brake lamp on the vehicle;
- each of the plurality of light guides comprises at least one of PMMA and polycarbonate;
- the central lens comprises a pillow lens; and
- the central lens comprises an aspheric lens.

According to a second aspect of the present disclosure, a vehicle lamp is provided and includes a connector configured to connect to a vehicle, a light source, a central lens optically aligned with the light source to receive a first portion of light emitted by the light source and transmit the first portion of light in a first output beam, and a side emitting lens generally disposed between the central lens and the light source and arranged to receive a second portion of the light. The vehicle lamp also includes a plurality of light guides each having a light input end and operatively coupled to the side emitting lens to receive the second portion of light emitted from the light source that is directed through the side emitting lens and having a light output end, wherein each of the plurality of light guides has a light refraction structure on a rear side for directing the second portion of the light in a second output beam from a front side.

Embodiments of the second aspect of the present disclosure can include any one or a combination of the following features:

- the light refraction structure comprises a plurality of prisms;
- each prism has a V-shaped groove formed in a surface of a light transmissive medium;
- the V-shaped groove has an incline angle in the range of 30-60 degrees, and wherein each prism has a depth and a length that increases along a length of the light guide from a first location closer to the input as compared to a second location closer to the output;
- a gap between adjacent prisms decreases along a length of the light guide from the light input end to the light output end;
- the light refraction structure comprises a textured surface;
- the textured surface increases in density from the input to the output; and
- the lamp is configured to be installed as a brake lamp on the vehicle.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
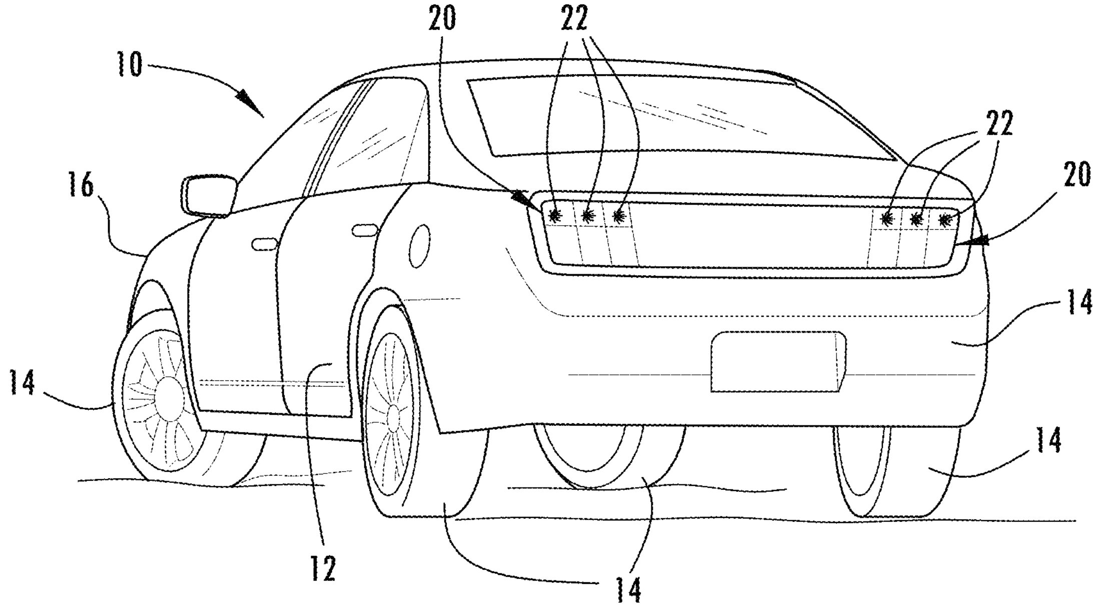
FIG. 1 is a rear perspective view of a motor vehicle equipped with exterior lamps including brake lamps and taillamps, according to one example.
Figure 2:
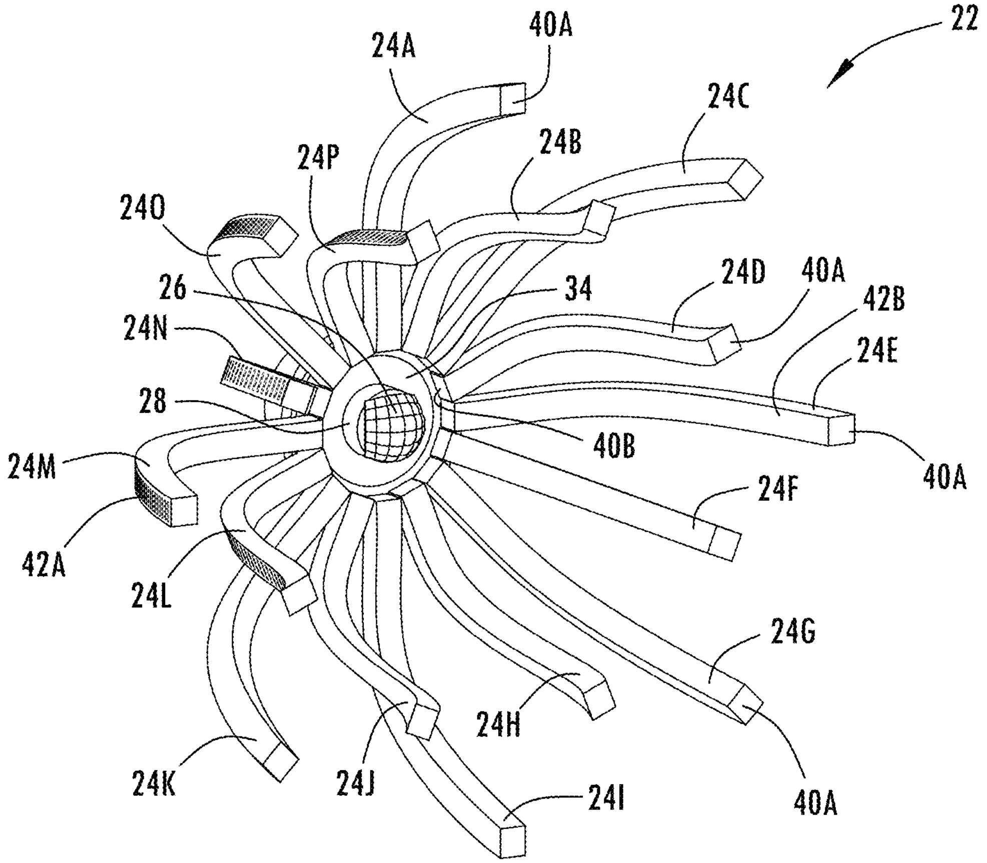
FIG. 2 is a front perspective view of one lamp having optics and light guides configured with prisms, according to one embodiment.
Figure 3:
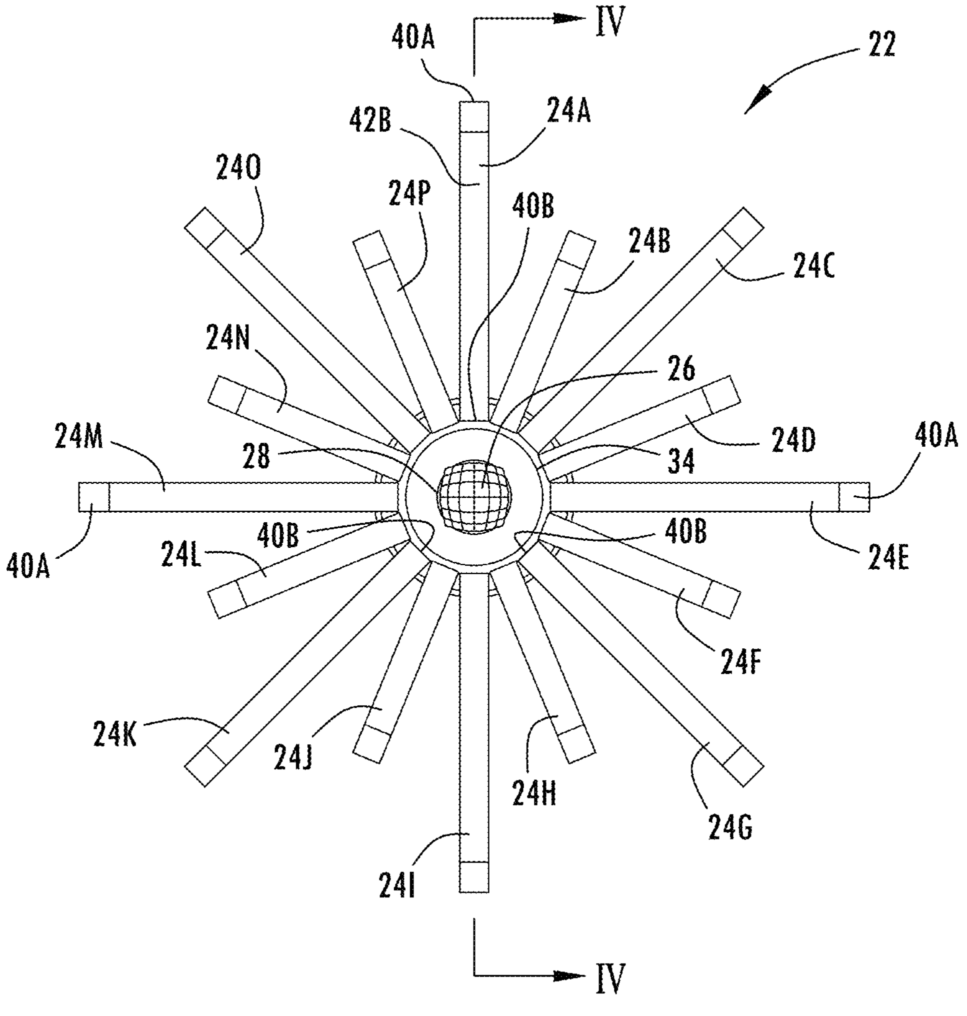
FIG. 3 is a front view of the lamp shown in FIG. 2.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a lamp having an arrangement of optics and light guides for distributing and emitting light. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10 is generally illustrated equipped with a plurality of lamps 22 generally shown located on the exterior at the rear end 14 of the motor vehicle 10. The plurality of lamps 22 in the example shown are configured as brake lamps and taillamps, also referred to as brake lights and taillights, generally located in a pair of lamp assemblies 20 at the rear end 14 of the motor vehicle 10 near the opposite lateral corners. Each lamp 22 when configured as a brake lamp advantageously provides for light illumination when the vehicle 10 is braking, whereas when configured as the taillamp may provide more continuous light illumination that is generally viewable from behind the vehicle 10.

Figure 4:
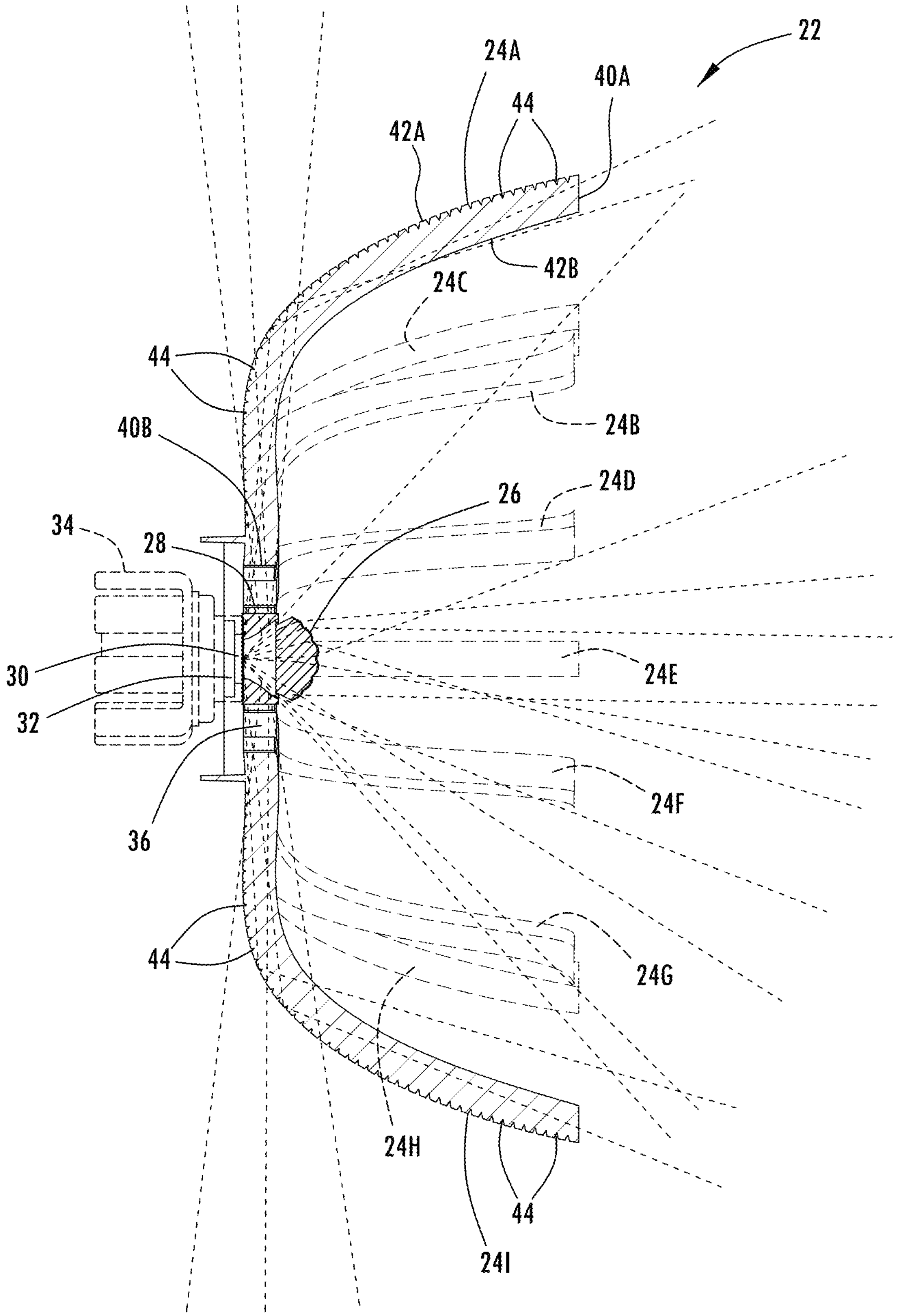
FIG. 4 is an enlarged cross-sectional view of the lamp taken through line IV-IV of FIG.
Figure 5A:
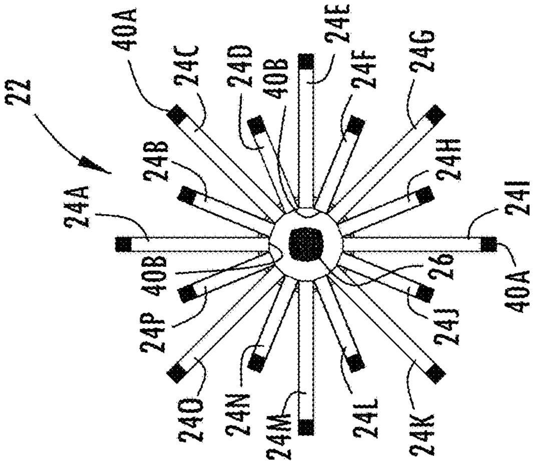
FIG. 5A is a front view of the lamp shown in FIG. 2.
Figure 5B:
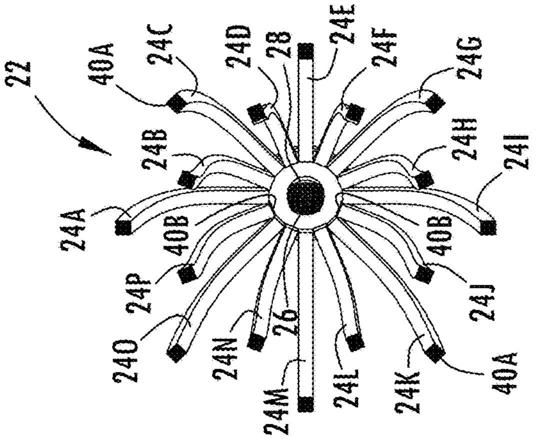
FIG. 5B is a slightly rotated right perspective view of the lamp shown in FIG. 2.
Figure 5C:
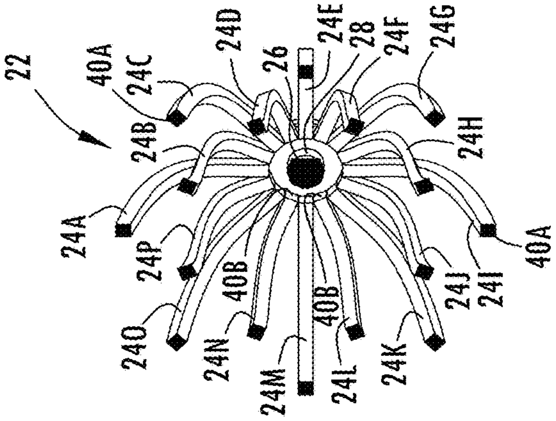
FIG. 5C is a further rotated right perspective view of the lamp shown in FIG. 2.
Figure 5D:
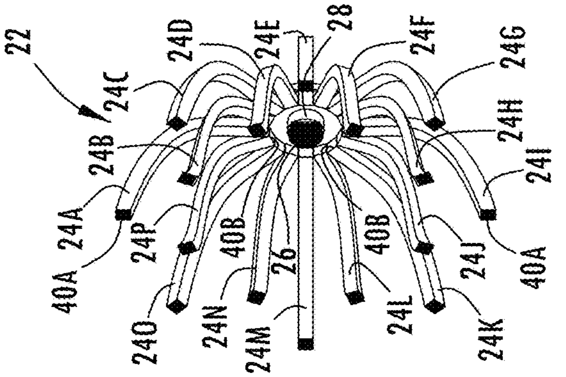
FIG. 5D is yet a further rotated right perspective view of the lamp shown in FIG. 2.

Each lamp 22 is further configured as a lamp 22 illustrated in FIGS. 2-6B. Each lamp 22 may include an optical system that includes a central lens 26 located in front of the light source 30 and distanced therefrom and a side emitting lens 28 generally disposed in a cylindrical perimeter between the central lens 26 and the light source 30. The central lens 26 is a transparent optical component that is generally shown having a partial spherical shape with an array of curved or partial spherical sections in one example. The central lens 26 may be referred to as a pillow lens, according to one example. In another example, the central lens 26 is an aspherical lens. The central lens 26 has an optical axis generally centered about the light output beam. The central lens 26 may be made of glass and is generally light transparent. Light from the light source 30 such as a light-emitting diode (LED) is emitted in a first beam through the central lens 26 as seen in FIG. 4 where a narrow band of the light is collected and redirected into a second beam which may converge or diverge into a desired beam pattern. The light transmitted through central lens 26 may be captured within a narrow band field of view±45°, for example. The central lens 26 may be made of glass, for example.

The side emitting lens 28 generally extends between the light source 30 and the central lens 26 and has a generally ring or cylindrical shape with side walls that capture a wide band of the first beam of light emitted from the light source 30 in a wide angle such as beyond 45° and redirects the wide band light perpendicular to the side walls of the ring-shaped side emitting lens 28 such that the light rays are directed into input ends 40B of each of the surrounding light guides 24A-24P. As a result of the optical system, light illuminated within the narrow band such as 45° or less is generally directed through the central lens 26 and light emitted in the wider band such as greater than 450 is captured and redirected by the side emitting lens 28 and redirected and transmitted into the input ends 40B of light guides 24A-24P. The light source 30 may be an LED which has a Lambertian light distribution. Wide angle light not collected by the central lens 26 may advantageously be collected and transmitted by the side emitting lens 28.

The lamp 22 includes a plurality of light guides 24A-24P generally oriented around the central lens 26 and side emitting lens 28 at equi-angular distances. In the example shown, sixteen (16) light guides 24A-24P are included, each arranged at an angle of about 22.5° extending around the side emitting lens 28. Each of the light guides 24A-24P includes an input end 40B oriented perpendicular to the side emitting lens 28 and aligned therewith to receive light rays that are redirected laterally perpendicular to the optical axis of the central lens 26 outward by the side emitting lens 28. Each of the light guides 24A-24P also includes an elongated curved arm and an output end 40A at the extreme terminal end thereof. Each of the light guides 24A-24P may curve along the length such that the portion adjacent to the output end 40A is bent by approximately 75°, for example, relative to the input end 40B. As such, the sixteen (16) light guides 24A-24P form a generally curved truncated cone or U-shape. Each of the light guides 24A-24P has a generally rectangular, such as square, cross-sectional shape that includes a front side 42B and a rear side 42A connected by lateral side walls. Each of the light guides 24A-24P collects light at the input end 40B and transmits it towards the output end 40A and emits the light from the front side 42B along the length of each light guide as well as from the output end 40A. As such, each light guide is a high loss light guide for distributing and emitting light from the front side 42B as well as from the output end 40A. The rear side 42A of each light guide is shown in FIGS. 4, 6 and 6A having a light refraction medium having a plurality of prisms 44 formed in the surface for reflecting and refracting and directing the light such that the light is emitted from the front side 42B in a substantially uniform pattern, according to one embodiment.

Figure 6:
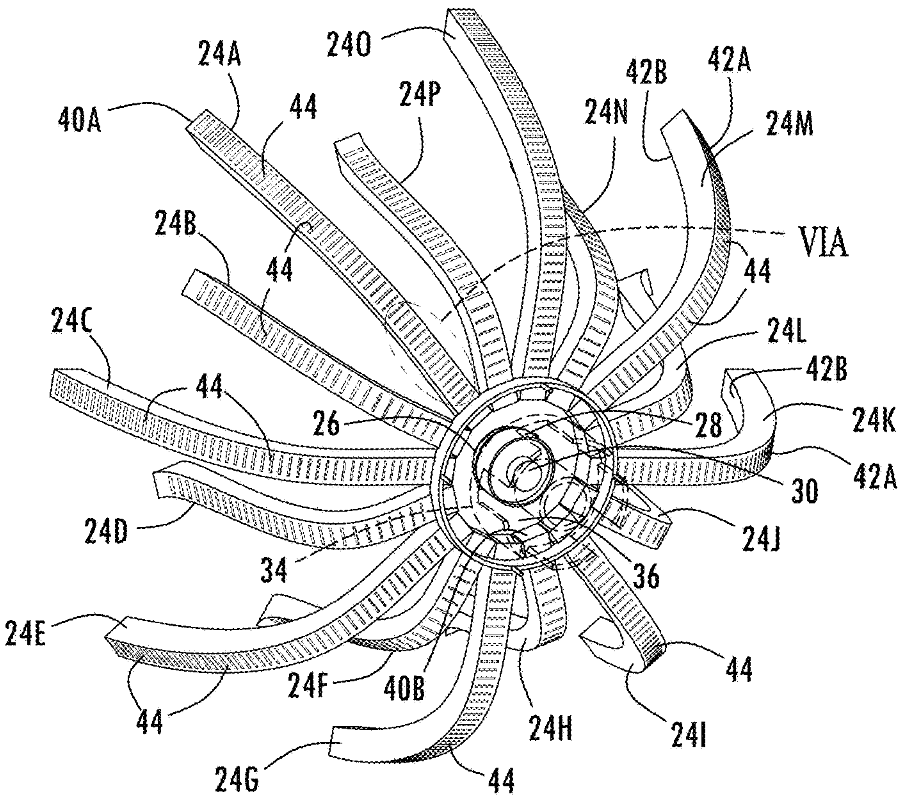
FIG. 6 is a rear perspective view of the lamp shown in FIG. 2.
Figure 6A:
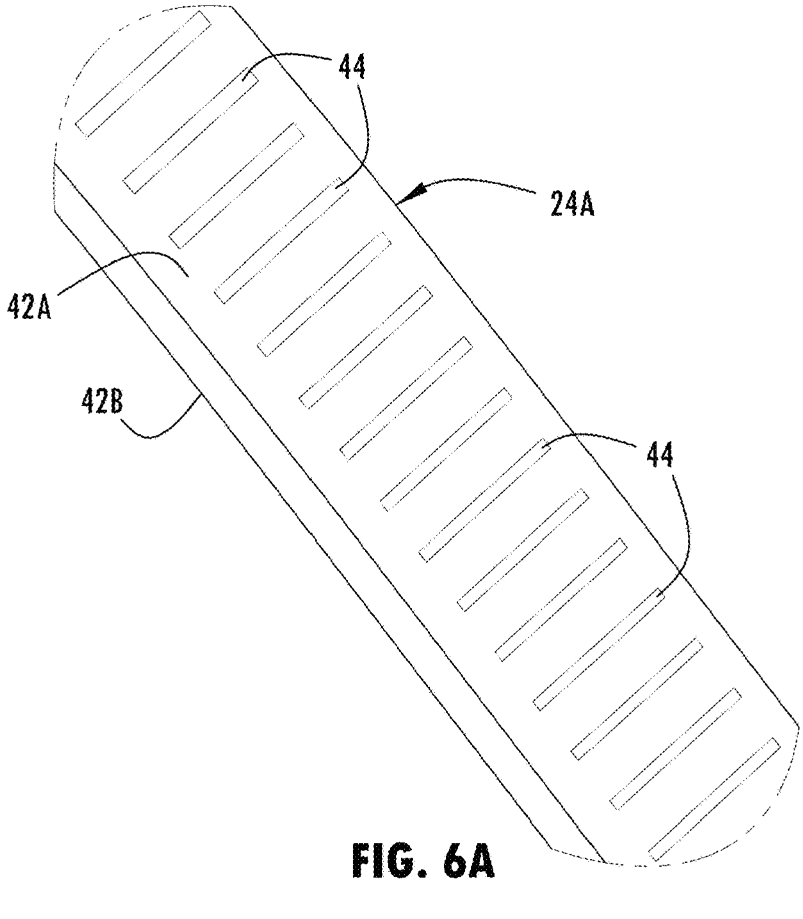
FIG. 6A is an enlarged view of section VIA in FIG. 6 showing one of the light guides of the lamp having a light diffraction surface formed by a plurality of prisms, according to one embodiment.
Figure 6B:
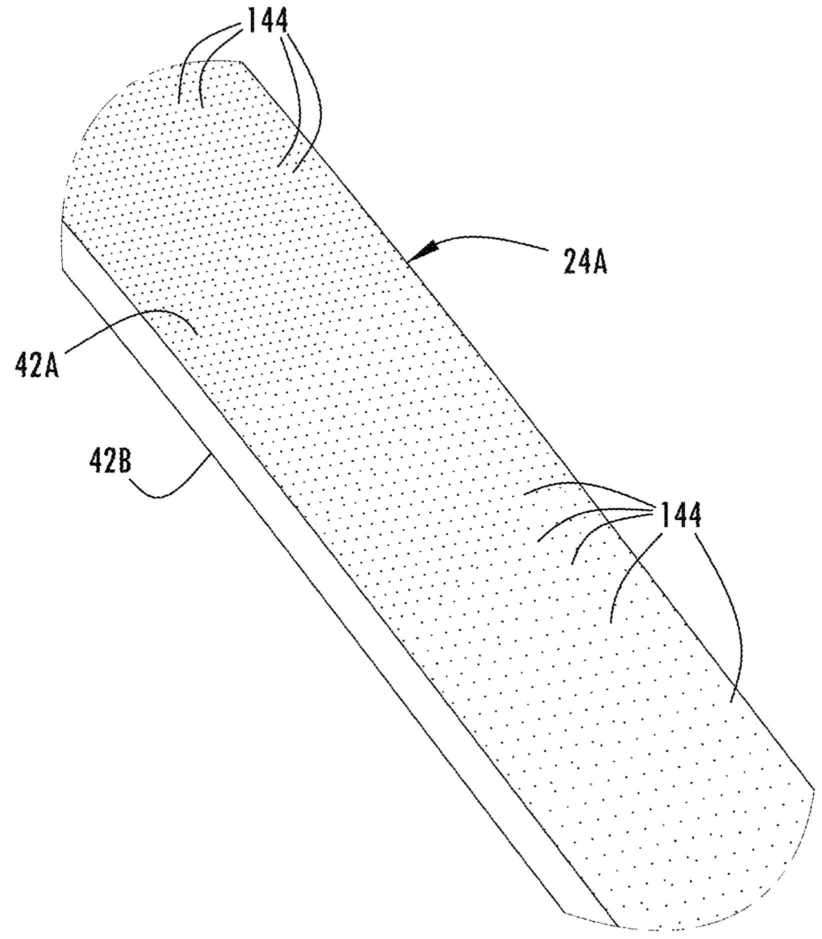
FIG. 6B is an enlarged view of a section of a light guide of the lamp shown having a light diffraction surface formed by a textured surface, according to another embodiment.

Referring to FIG. 6B, another embodiment of a light guide is illustrated having a light refraction medium having a textured surface 144 formed on the rear side 42A of each light guide for reflecting and refracting the light to direct the light forward to emit from the front side 42A. The textured surface 144 may be formed by forming scratches or dimples, for example, on the rear surface that cause some of the light transmitted through the light guide to refract forward and exit out the front side 42A of the light guide. The textured surface 144 has roughened surface with a pattern that may increase in density and size along a length extending from the input end 40B towards the output end 40A. As such, a more uniform light distribution is achieved along the length of the light guide. By adding prism optics or grains on the rear side 42A of the light guides, we can do selective grain spots, then create multiple spots as an alternative or uniform strip or lines that are grained and the rest is specular to create multiple lit shapes.

Each of light guides 24A-24P may be made of an injection molded light transmissive material that receives and transmits light illumination from a light source and distributes the light and emits the light throughout at least a front side wall portion 42B and output end 40A of the light guide along the length of the light guide. Light source 30, such as a light-emitting diode (LED), is operatively coupled to the input end 40B of each light guide via the side emitting lens 28. As such, light emitted in the wide band by the light source 30 is illuminated into the light guides at the input ends 40A-40P and distributed throughout the length of the light guides and is emitted on the front side with substantially uniform light distribution and at the output end 40A. The light source 30 may be configured as one or more red-green-blue (RGB) LEDs that may emit light of a desired color which may include color mixing of the red, green and blue colored light.

Each light guide 24A-24P is further illustrated in greater detail in FIGS. 4, 6 and 6A. The light guide is made of a light transmissive medium operatively configured to receive light at the input end 40B and to distribute the light throughout the light guide and emit the light from the front side 42B and output end 40A. The light guide has a length may be made of a light transmissive medium having a high index of refraction in the range of about 1.4 to 1.7, according to one embodiment. The light transmissive medium may include a transparent and rigid plastic such as polymethyl methacrylate (PMMA), which is a synthetic resin produced from the polymerization of methacrylate and has an index of refraction of about 1.49, according to one example. According to another example, the light transmissive medium may include a thermoplastic polymeric, such as polycarbonate having an index of refraction of about 1.59. The light guide may be formed in a mold using injection molding. The light guides can be designed with different shapes to create a three-dimensional appearance.

Each of light guide 24A-24P is formed to include a light refraction medium having a series of prisms 44 in one embodiment which generally extend in a periodic arrangement along the length on the rear side of each light guide according to one embodiment. The series of prisms 44 may be integrally formed the rear side of the light transmissive medium during the injection molding process. By forming a series of prisms 44 in each light guide, light distributed within the light guides may be directed in a pattern for emission from the light guides. Each prism 44 may be formed as a V-shaped groove or depression in the surface of the light guide and has a cross-sectional saw tooth shape with an incline angle $\alpha$ in a range of about 30°-60°, and more particularly at an angle of about 45°. Each prism 44 may be defined by a V-shaped groove having a depth and a length that increases along the length of the light guide from the input end 40B to the output end 40A and a separation gap between adjacent prisms 44 that decreases along the length of the light guide from the input end 40B to the output end 40A. As seen in FIGS. 4 and 6A, the series of prisms 44 increase in depth and length and the separation gap decreases to reflect and refract the light to achieve a substantially uniform light emission as the light is transmitted from the input end 40B towards the output end 40A.

It should be appreciated that each of the series of prisms 44 may have an incline angle and decline angle that define the V-shaped groove or saw tooth shape of each prism 44. Each angle may be approximately 45°, according to one example. As such, each of the series of prisms 44 may reflect or refract light transmitted through the light guide within an output window along a length of the light guide.

Accordingly, a lamp 22 is provided having a light source 30, and optics that includes a central lens 26 and a side emitting lens 28 and a plurality of light guides 24A-24P optically coupled to the side emitting lens 28 to provide for a high optical efficiency light device. The lamp 22 is particularly useful on a motor vehicle, such as for a stop lamp or a taillamp, for example. The lamp 22 preferably has a minimum lit surface area of 50 $cm^2$, in one example.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A lamp comprising:

a light source;

a central lens having an optical axis optically aligned with the light source to receive a first portion of light emitted by the light source and transmit the first portion of light in a first output beam centered about the optical axis;

a side emitting lens arranged perpendicular to the optical axis directly below the central lens and generally disposed between the central lens and the light source and arranged to receive a second portion of the light and direct the second portion of the light perpendicular to the optical axis; and a plurality of light guides each having a light input end and operatively coupled to the side emitting lens to receive the second portion of light emitted from the light source that is directed through the side emitting lens and having a light output end, wherein each of the plurality of light guides has a light refraction structure on a first side for directing the second portion of the light in a second output beam from a second side.

2. The lamp of claim 1, wherein the light refraction structure comprises a plurality of prisms.

3. The lamp of claim 2, wherein each prism has a V-shaped groove formed in a surface of a light transmissive medium.

4. The lamp of claim 3, wherein the V-shaped groove has an incline angle in the range of 30-60 degrees, and wherein each prism has a depth and a length that increases along a length of the light guide from a first location closer to the input as compared to a second location closer to the output.

5. The lamp of claim 4, wherein a gap between adjacent prisms decreases along a length of the light guide from the light input end to the light output end.

6. The lamp of claim 1, wherein the light refraction structure comprises a textured surface.

7. The lamp of claim 6, wherein the textured surface increases in density from the input to the output.

8. The lamp of claim 1, wherein the lamp is configured to be installed on a vehicle.

9. The lamp of claim 8, wherein the lamp is configured to be installed as a brake lamp on the vehicle.

10. The lamp of claim 1, wherein each of the plurality of light guides comprises at least one of PMMA and polycarbonate.

11. The lamp of claim 1, wherein the central lens comprises a pillow lens.

12. The lamp of claim 1, wherein the central lens comprises an aspheric lens.

13. A vehicle lamp comprising:

a connector configured to connect to a vehicle;

a light source;

a central lens having an optical axis optically aligned with the light source to receive a first portion of light emitted by the light source and transmit the first portion of light in a first output beam centered about the optical axis;

a side emitting lens arranged perpendicular to the optical axis directly below the central lens and generally disposed between the central lens and the light source and arranged to receive a second portion of the light and direct the second portion of the light perpendicular to the optical axis; and a plurality of light guides each having a light input end and operatively coupled to the side emitting lens to receive the second portion of light emitted from the light source that is directed through the side emitting lens and having a light output end, wherein each of the plurality of light guides has a light refraction structure on a rear side for directing the second portion of the light in a second output beam from a front side.

14. The vehicle lamp of claim 13, wherein the light refraction structure comprises a plurality of prisms.

15. The vehicle lamp of claim 14, wherein each prism has a V-shaped groove formed in a surface of a light transmissive medium.

16. The vehicle lamp of claim 15, wherein the V-shaped groove has an incline angle in the range of 30-60 degrees, and wherein each prism has a depth and a length that increases along a length of the light guide from a first location closer to the input as compared to a second location closer to the output.

17. The vehicle lamp of claim 16, wherein a gap between adjacent prisms decreases along a length of the light guide from the light input end to the light output end.

18. The vehicle lamp of claim 13, wherein the light refraction structure comprises a textured surface.

19. The vehicle lamp of claim 18, wherein the textured surface increases in density from the input to the output.

20. The vehicle lamp of claim 13, wherein the lamp is configured to be installed as a brake lamp on the vehicle.

* * * * *